G. CONSTANTINESCO.
PUMP.
APPLICATION FILED MAR. 8, 1918.
1,278,439.
Patented Sept. 10, 1918.
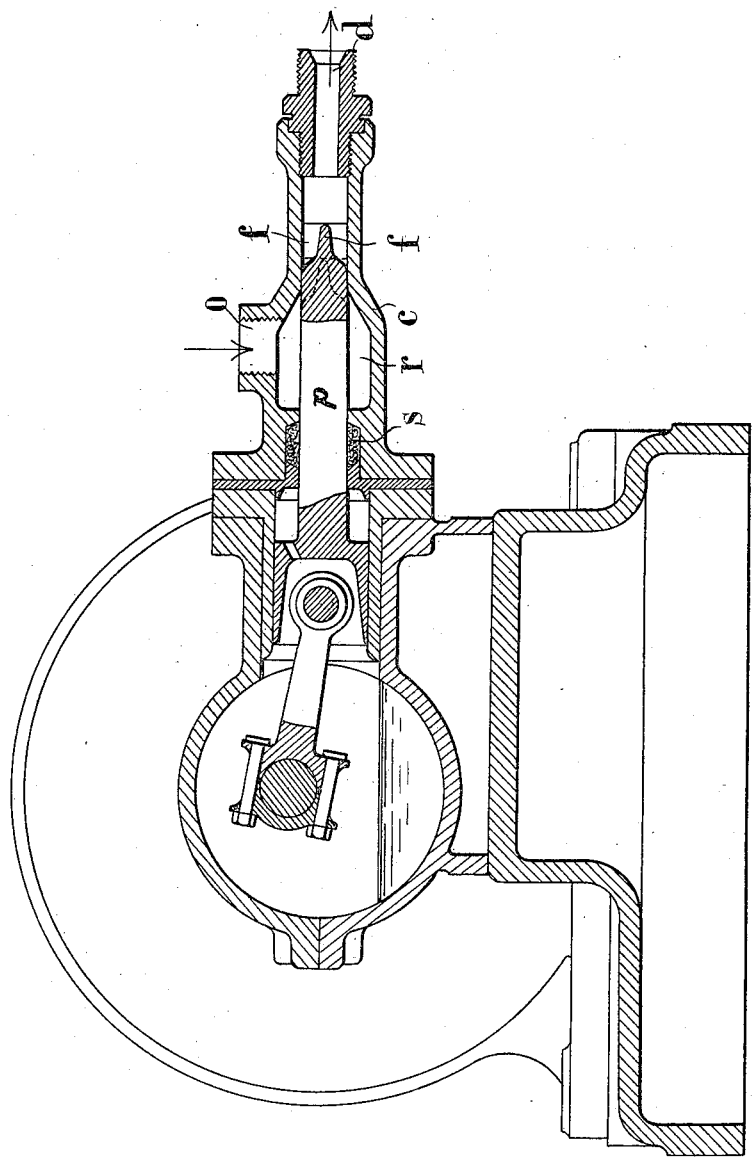
INVENTOR
G. Constantinesco
BY H. R. Kerslake
ATTORNEY

UNITED STATES PATENT OFFICE.

GEORGE CONSTANTINESCO, OF ALPERTON, ENGLAND.

PUMP.

1,278,439.  Specification of Letters Patent. Patented Sept. 10, 1918.

Application filed March 8, 1918. Serial No. 221,219.

*To all whom it may concern:*

Be it known that I, GEORGE CONSTANTINESCO, a subject of the King of Great Britain and Ireland, and residing at Westoe, Stanley avenue, Alperton, in the county of Middlesex, England, have invented certain new and useful Improvements in Pumps, of which the following is a specification.

The present invention relates to piston pumps and has for its object to construct a pump capable of working at very high speeds.

In pumps as heretofore constructed of the piston type, difficulties are experienced in working at very high speeds, one of the main troubles being that the valves, especially the suction valve, fail to operate quickly enough.

The invention consists in a valveless pump comprising a piston working for a part of its stroke inside, and for a part of its stroke outside on the suction side of a cylinder which is connected to a pipe of sufficient length to allow the inertia of the liquid expelled from the pump to operate to draw in more liquid when the piston is out of the cylinder.

The invention further consists in the improved pumps hereinafter described.

The accompanying drawing is a longitudinal section of a pump made in accordance with the invention.

In carrying the invention into effect according to the example illustrated, I provide a piston $p$ consisting of a simple rod reciprocated by a crank and connecting rod in any suitable manner. The piston works in guides in a vessel $r$ into which the liquid to be pumped can enter through the inlet $o$ under atmospheric or other pressure. The end of this vessel $r$ forms the pump cylinder $c$. The cylinder $c$ is so placed relatively to the piston $p$ that the piston, which must fit the cylinder, works in the cylinder only for a portion of its stroke allowing a free space for liquid to pass into the cylinder from the vessel when the piston is at the inner end of its stroke. The outer end of the cylinder is connected to a long rigid pipe $d$ leading to an air vessel or to any suitable discharge reservoir.

In the pump illustrated the end of the piston is provided with fins $f$ to assist in guiding it when at the end of the suction stroke. The position of the piston at this instant is shown in dotted lines, the cylindrical portion of the piston being entirely withdrawn from the cylinder and a free passage afforded for the liquid from the suction chamber $r$ to the delivery pipe.

A stuffing box $s$ is provided to prevent the liquid from entering the crank case of the pump.

The operation of the apparatus is as follows:—

Suppose the outlet $d$ is connected to a pipe of 1.27 centimeters diameter and length six meters; the diameter of the piston being 2 centimeters and the stroke 2.5 centimeters; and suppose the outlet pipe to be connected to an air vessel at the end remote from the pump. If the pump chamber and delivery pipe are filled with liquid and no flow permitted from the air vessel, and the pump is driven, say, at 1500 revolutions per minute, on the forward stroke of the piston the liquid in the delivery pipe is accelerated against the pressure in the air vessel. On the return stroke the liquid will not follow the piston but will continue to move forward, creating a vacuum in the cylinder until the piston is withdrawn. As soon as a passage is provided by the withdrawal of the piston, liquid from the chamber $r$ rushes into the cylinder and fills the empty space between the piston and the moving liquid column. From this time until the piston again closes the cylinder on its forward stroke, the liquid continues to move forward drawing liquid from the chamber $r$. After the piston has again closed the cylinder on its forward stroke, the liquid column is again accelerated and the cycle is repeated. This goes on until a certain pressure has been reached in the air vessel which counterbalances the inertia effects of the liquid column in such a way that the kinetic energy imparted to the liquid by the piston is given back to the liquid column on its return by the pressure in the air vessel. Thus a position of equilibrium is reached beyond which the pressure does not increase.

If liquid is allowed to flow from the air vessel the flow increases and reaches a maximum when the pressure in the air vessel falls to the initial pressure.

In the example considered by calculation the pressure in the air vessel should reach about 14 kilograms per square centimeter when no flow is allowed. When flow is allowed the maximum power is absorbed by the pump when the pressure in the air vessel is allowed to drop to about 8 kilograms per square centimeter. If the flow is further increased the pressure again falls and the power absorbed diminishes to a minimum when no pressure is left in the air vessel. At this instant the flow is double the flow at a pressure of 8 kilograms per square centimeter.

Instead of an air vessel a spring-loaded piston or any like resilient device may be used.

In the above example the quantity of flow per second, when the end of the pipe is open to atmosphere, is about two-thirds of a liter per second, which is far in excess of the flow which could be obtained from an ordinary pump having suction and delivery valves pumping directly into an air vessel, in which case only about a third of the flow above given could be obtained for the same speed, assuming that the valves of such a pump would work at the high velocity considered.

According to another example of the invention, especially suitable for pumping lubricating oil, the pump may be arranged in a vertical position and the stuffing box $s$ dispensed with. The chamber $r$ might then form part of the crank case, the oil to be pumped being kept at a certain level above the cylinder $c$; it will be seen, however, that the pump illustrated is capable of creating a suction at the inlet $o$ and can consequently lift liquid from a sump if desired.

It is, however, extremely important that the delivery pipe should not be expansible and that there should be no air vessel at the pump end of the delivery pipe, as in such case the pump would be inoperative since the working depends on the inertia of the liquid column in the delivery pipe.

It should be noted that by means of the invention it is possible to construct high speed pumps for any kind of liquid such as water, petroleum, benzol, alcohol, etc., while the absence of valves makes the pumps extremely suitable for pumping liquids containing impurities. Further it is possible to construct low speed pumps on the same principle.

It should be noted also that the delivery of the pump may be greater than the actual displacement of liquid effected by the piston, so that high volumetric efficiencies may be obtained.

Having now described my invention, what I claim as new and desire to secure by Letters Patent is:—

1. A valveless pump comprising a cylinder member, a piston member working in the cylinder member, one of said members being provided with means to permit the passage of fluid between the cylinder member and piston member without entirely withdrawing the piston from the cylinder, and a delivery pipe connected to the outlet end of said cylinder and of sufficient length to allow the inertia of the fluid expelled from the pump to operate to draw in more liquid when the piston has been withdrawn from the cylinder a sufficient distance to permit the passage of fluid past the piston and into the cylinder.

2. A valveless pump comprising a cylinder member, a piston member working in the cylinder member, fluid passages in the front end of the piston to permit the passage of fluid between the cylinder member and piston member without entirely withdrawing the piston from the cylinder and a delivery pipe connected to the outlet end of said cylinder and of sufficient length to allow the inertia of the fluid expelled from the pump to operate to draw in more liquid when the piston has been withdrawn from the cylinder a sufficient distance to permit the passage of fluid past the piston and into the cylinder.

In testimony whereof I have signed my name to this specification.

GEORGE CONSTANTINESCO.

Copies of this patent may be obtained for five cents each, by addressing the "Commissioner of Patents, Washington, D. C."